DIGITAL

United States Patent [19]
Chisholm

[11] Patent Number: 5,149,948
[45] Date of Patent: Sep. 22, 1992

[54] IMPROVED BAR CODE READER SYSTEM FOR READING BAR CODES UNDER HIGH SPECULAR REFLECTION CONDITIONS WITH A VARIETY OF SURFACE EFFECTS

[75] Inventor: Thomas J. Chisholm, Milton, Mass.
[73] Assignee: Computer Identics, Canton, Mass.
[21] Appl. No.: 553,859
[22] Filed: Jul. 16, 1990
[51] Int. Cl.$^5$ ............................................. G06K 7/10
[52] U.S. Cl. .................................... 235/462; 235/455
[58] Field of Search .............. 235/462, 472, 457, 454; 369/18, 116, 124; 250/225

[56] References Cited

U.S. PATENT DOCUMENTS

| | | | |
|---|---|---|---|
| 3,801,182 | 4/1974 | Jones | 250/225 |
| 3,812,374 | 5/1974 | Tuhro | 235/462 |
| 4,211,918 | 7/1980 | Nyfeler | 235/454 |
| 4,469,442 | 9/1984 | Reich | 250/225 |
| 4,631,713 | 12/1986 | Romeas et al. | 369/116 |
| 4,682,015 | 7/1987 | Quan | 235/472 |
| 4,794,238 | 12/1988 | Hampton | 235/462 |
| 4,820,911 | 4/1989 | Arackellian et al. | 235/462 |
| 4,894,817 | 1/1990 | Tanaka et al. | 235/454 |

FOREIGN PATENT DOCUMENTS 280979 12/1987 Japan .................................. 235/462

*Primary Examiner*—John W. Shepperd
*Assistant Examiner*—Michael Kessell
*Attorney, Agent, or Firm*—Iandiorio & Dingman

[57] ABSTRACT

An improved bar code reading system for reading bar codes having a wide range of intensity of reflected radiation includes repeatedly scanning a beam of radiation across a bar code containing bar and space code elements; monitoring the number of scans of the beam across the bar code; sensing the radiation reflected from the bar code and providing a bar code signal representative thereof; the bar code signals are amplified at one of a number of different gains, and a different gain is selected for each scan. Also disclosed is an improved bar code reader system for reading bar codes of diffuse bar elements and specular spaced elements. A bar code is illuminated with radiation polarized in a first direction at an acute angle to the surface of the bar code and generally parallel to the bars and spaces for diverting radiation reflected from the specular spaces away from the scanner and for directing a portion of the radiation reflected from specular imperfections in the bars to the receiver; a crossed-polarizer blocks substantially all the radiation directed back to the scanner from the specular spaces and the specular imperfections in the bar, and transmits to the scanner substantially all the diffuse radiation from the bars and a portion of the return of the specular imperfections of the bars.

13 Claims, 4 Drawing Sheets

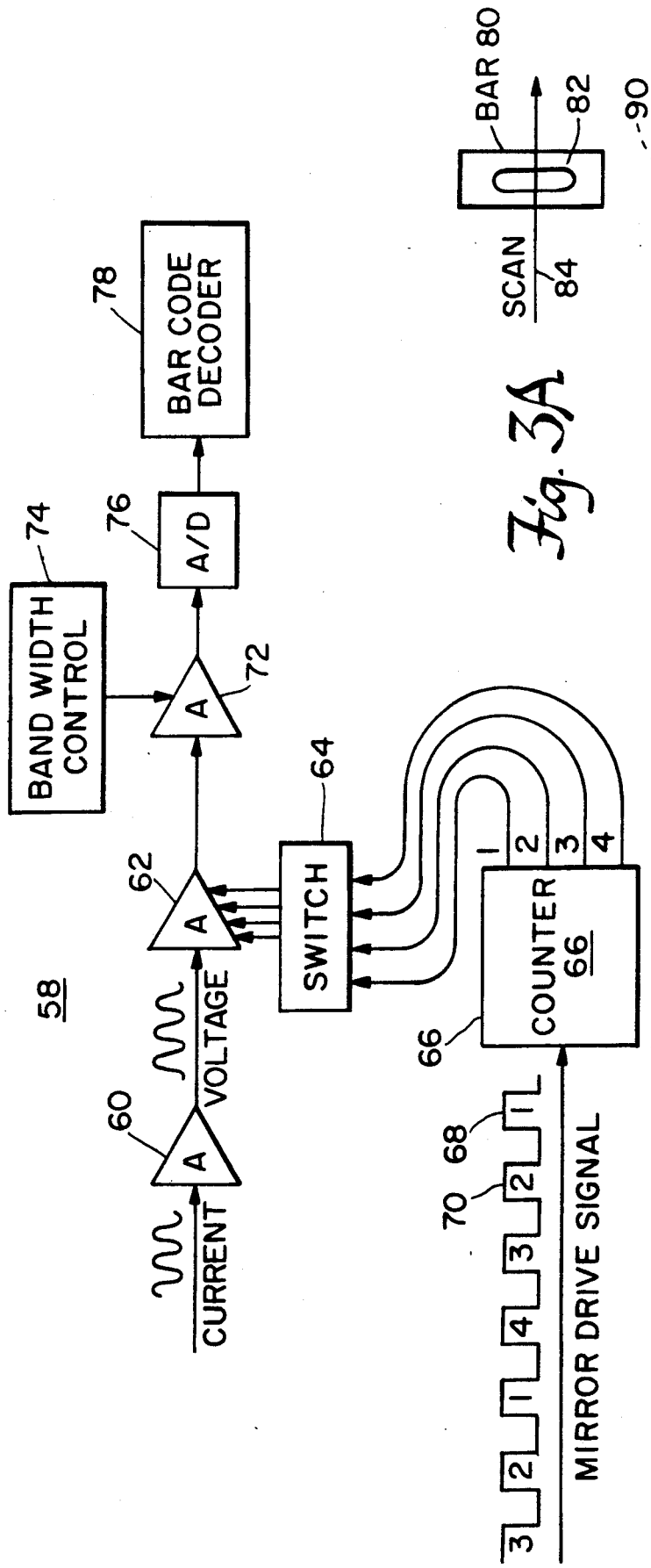

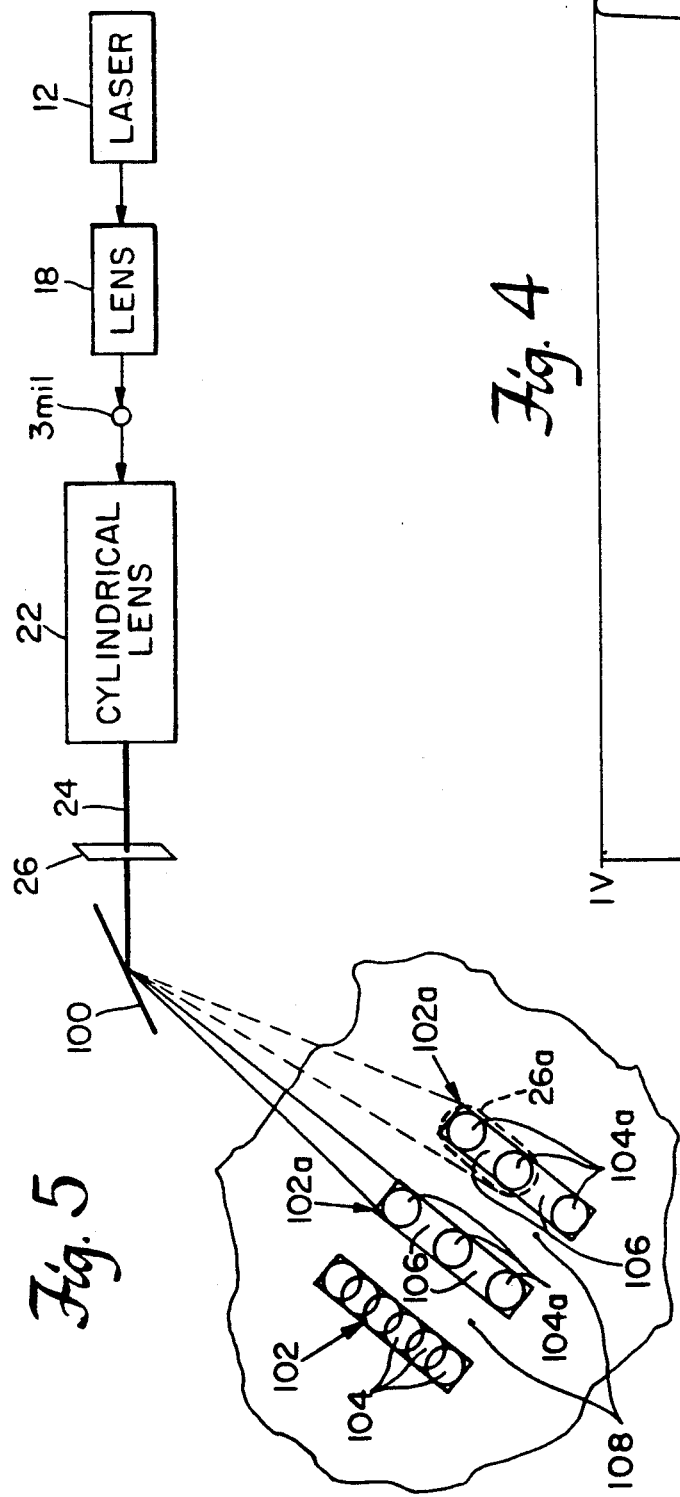
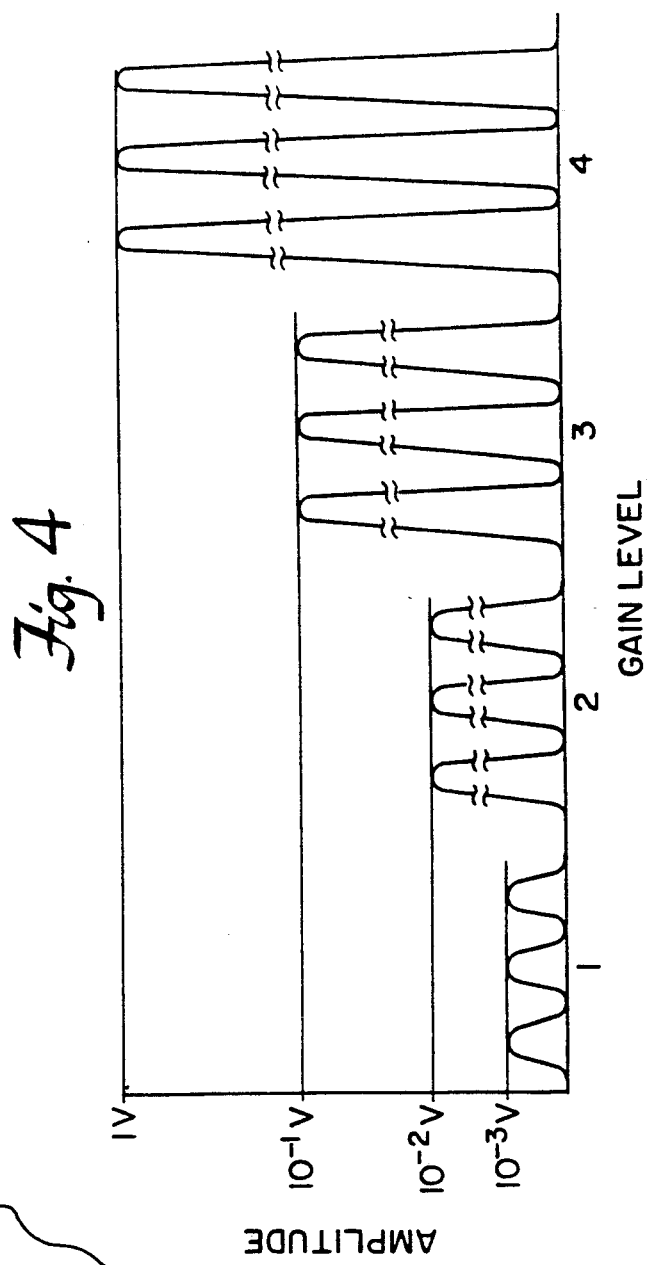
Fig. 4
Fig. 5

IMPROVED BAR CODE READER SYSTEM FOR READING BAR CODES UNDER HIGH SPECULAR REFLECTION CONDITIONS WITH A VARIETY OF SURFACE EFFECTS

FIELD OF INVENTION

This invention relates to an improved bar code reader system especially effective for reading optical codes such as bar codes under high specular reflection conditions and subject to a variety of surface defects.

BACKGROUND OF INVENTION

Silicon wafers used in making integrated circuits begin as single crystal four, five or eight inch discs worth $50-200 and after final processing may be worth upwards of $18,000. It is therefore essential that close track be kept of them through as many as four hundred different process steps. To track these wafers they are marked and may be read by OCR readers which cost about $50,000 each or by human eye, neither of which is highly reliable. It has been suggested to use bar codes and bar code readers, but this approach too has a number of shortcomings.

The bars are formed on the wafer by etching with a laser beam, for example, and the spaces are the unetched areas between the bars which are the wafer surface. In general the spaces reflect scanner light highly specularly while the etched bars reflect diffusely but both are extremely strong, i.e., bright signals, so that there is little contrast between them. It has been recognized, however, in U.S. patent application Ser. No. 450,243, Improved Bar Code Reader System, filed Dec. 13, 1989, in the name of the same inventor, that since laser light is polarized and since specularly reflected light maintains the original laser beam polarization, a crossed-polarizer could be used to block that specularly reflected light. This virtually completely "throws away" the space signals by making them appear black but the diffuse signal from the bars loses only a small portion of its energy to the crossed-polarizer while the remainder is detected and is in strong contrast to the specular signals. Thus the code signals have been essentially reversed so that black appears white and white, black. However, there have appeared still further problems.

Various coatings, processings and imperfections such as underheating and puddling can cause the bars or portions thereof to reflect specularly as a space, confusing the system into recognizing a wider space when in fact it is scanning a bar.

Imperfections in the bar code surface can make local areas of a bar and of a space appear as the other and result in false signals. For example, a bar with a "space-like" imperfection in the middle may be read as a bar, a space and another bar—three signals where there should be but one.

During the processing, through as many as 400 different process steps, the wafer surface undergoes various coatings and finishes. Each of these can vary the reflectivity characterization of the surface so that the signal ratio from state to state of a bar or space may vary by a factor of 1000:1.

Finally, if the laser beam dot is not controlled properly the dots will not be made to overlap and form a proper bar: there will be unetched spaces between the etched dots along the bar. A scanner traversing the bar in the unetched portions of the bar will respond as if it has read a space.

SUMMARY OF INVENTION

It is therefore an object of this invention to provide an improved bar code reader for reliably reading bar codes on highly specular surfaces such as silicon wafers.

It is a further object of this invention to provide such an improved bar code reader which can discern between normal specular reflection from spaces and the specular reflection from imperfections in the bars.

It is a further object of this invention to provide such an improved bar code reader which overcomes voids in the bar created during laser dot etching of the bars.

It is a further object of this invention to provide such an improved bar code reader which accommodates a wide range of bar code signal strengths.

It is a further object of this invention to provide such an improved bar code reader which suppresses false signals that may be introduced by imperfections in the bar code.

The invention results from the realization that a more effective bar code reader with higher tolerance to specular reflection and surface imperfections can be achieved by providing selectable, multiple gain signal processing to accommodate for wide divergence in surface reflectivity, by tilting the scanner and bar code surface relative to one another and using a slightly less than fully crossed polarizer to block unwanted specular reflection and pass sufficient diffuse radiation as well as some specular imperfections, by adjusting bandwidth to exclude multiple signals from a single code element, and by expanding the scanning beam to encompass more of the code element.

This invention features an improved code reader system for reading bar codes having a wide range of intensity of reflected radiation. There are means for repeatedly scanning a beam of radiation across a bar code containing bar and space code elements and means for monitoring the number of scans of the beam across the bar code. Means for sensing the radiation reflected from the bar code provides a bar code signal representative thereof. There are means responsive to the means for sensing for amplifying the bar code signal at one of a number of different gains and means responsive to the means for monitoring for selecting a different gain for the means for amplifying for each scan.

In a preferred embodiment the means for scanning may include means for providing a beam of radiation of elongated cross section in a direction of the bars and spaces. The system may further include means for limiting the bandwidth of the acceptable bar code signal to exclude multiple signals generated from a single bar code element. The means for sensing may include means for illuminating a bar code with radiation polarized in the first direction at an acute angle to the surface of the bar code and generally parallel to the bars and spaces for diverting radiation reflected from the specular spaces away from the means for sensing and for directing a portion of the radiation reflected from specular imperfections in the bars to the means for sensing; and crossed-polarizing means for blocking from the means for sensing substantially all the radiation directed from the specular spaces and from the specular imperfections in the bars and transmitting to the means for sensing substantially all the diffuse radiation from the bars and a portion of the return of the specular imperfections of the bars.

The invention also features a method of reading bar codes having a wide range of intensity of reflected radiation, including repeatedly scanning a beam of radiation across a bar code containing bar and space code elements; and monitoring the number of scans of the beam across the bar code. Radiation reflected from the bar code is sensed to provide a bar code signal representative thereof. The bar code signal is amplified at one of a number of different gains and a different gain is selected for amplifying each scan.

The invention also features an improved bar code reader system for reading bar codes with diffuse bar elements and specular space elements. There are means for receiving radiation reflected from the bar code and means for illuminating a bar code with radiation polarized in a first direction at an acute angle to the surface of the bar code and generally parallel to the bars and spaces for diverting radiation reflected in the specular spaces away from the means for receiving and for directing a portion of the radiation reflected from specular imperfections in the bar to the means for receiving. Cross-polarizing means block from the means for receiving substantially all of the radiation directed to the means for receiving from the specular spaces and from the specular imperfections in the bars, and transmitting the means for receiving substantially all of the diffused radiation from the bars and a portion of the return of the specular imperfections of the bars.

In a preferred embodiment the means for eliminating includes means for providing a beam of radiation of elongated cross section in the direction along the bars and spaces. The system may further include means for limiting the bandwidth of the acceptable bar code signal to exclude multiple signals generated from a single bar code element. The means for illuminating may include means for repeatedly scanning a beam of radiation across a bar code containing bar and space code elements and means for monitoring the number of scans of the beam across the bar code. The means for receiving may include means for sensing the radiation reflected from the bar code and providing a bar code signal representative thereof; means responsive to the means for sensing for amplifying the bar code signal at one of a number of different gains; and means responsive to the means for monitoring for selecting a different gain for the means for amplifying from each scan. The acute angle may be approximately 22½°. The crossed-polarizing means may be less than fully crossed; in fact it may be more than 95% crossed. The invention also features a method employing a scanner for reading bar codes with diffuse bar elements and specular spaces. The bar code is illuminated with radiation polarized in the first direction at an acute angle to the surface of the bar code and generally parallel to the bars and spaces for diverting radiation reflected from the specular spaces away from the scanner, and for directing a portion of the radiation reflected from specular imperfections in the bars to the scanner. Substantially all the radiation blocked from the scanner by means of crossed-polarizing is substantially all of the radiation directed to the scanner from the specular spaces and from the specular imperfections in the bars and transmitting to the scanner substantially all the diffuse radiation from the bars and a portion of the return of the specular imperfections of the bars.

BRIEF DESCRIPTION OF DRAWINGS

Other objects, features and advantages will occur to those skilled in the art from the following description of a preferred embodiment and the accompanying drawings, in which:

FIG. 2 is a more detailed block diagram of the control circuit of FIG. 1;

FIGS. 3A, B and C are waveforms illustrating the problem addressed by the bandwidth controller of FIG. 2;

FIG. 4 illustrates the output waveforms for the four-level selectable gain system of FIG. 2;

FIG. 5 is a schematic block diagram illustrating the need for and the implementation of a beam expanding device according to this invention;

DISCLOSURE OF PREFERRED EMBODIMENT

Figure 1:
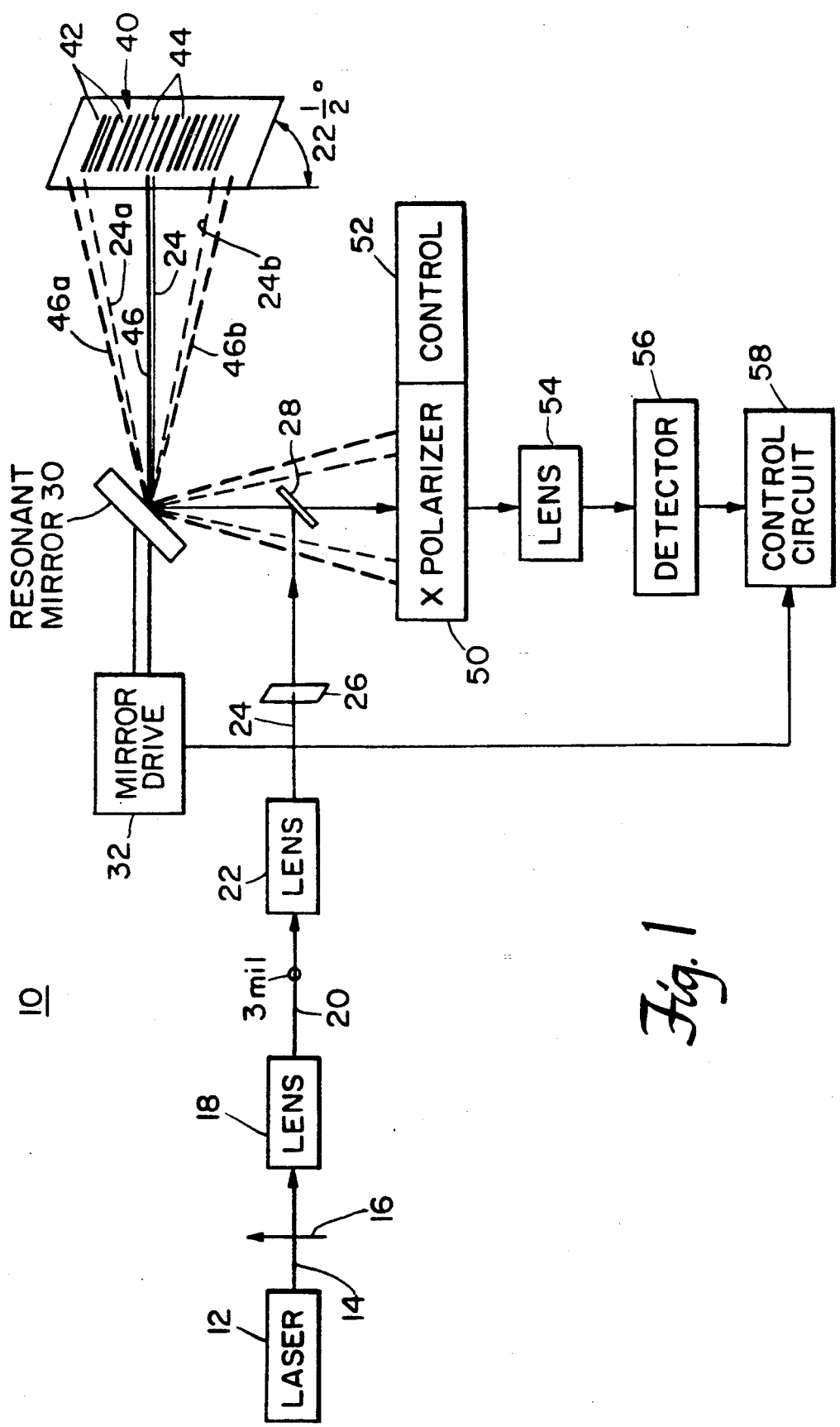
FIG. 1 is a schematic block diagram of an improved bar code reader system according to this invention

This invention is accomplished by techniques which address a number of different problems. When a laser beam generates too little heat during the embossing of a bar code on a silicon wafer, the silicon may melt and become shiny and highly specular. Also, when the etched bar is too shallow polishing may reach the bottom of the bar and create a shiny surface. In either case, a shiny specular spot in the midst of a bar which should be non-specular results in a scanner seeing two bars separated by an interstitial space where there should be simply one bar. This problem is addressed by reducing the band width, for example from 300 KHz to 200 KHz so that multiple scans for single bar code elements are excluded.

Because of the vagaries associated with up to 400 different processing steps in the fabrication of a silicon wafer, the signal strength of the radiation reflected from the surface of the bar code can vary by a factor of up to 1000. This is addressed by scanning the bar code a number of times and applying a different gain setting to the signal for each different scan so that at least one of the gain settings produces a signal appropriate for further processing circuitry.

Often the etching laser beam is not precisely controlled and so it forms bars with voids where the laser beam dot has not overlapped with neighboring dots. These voids or spaces of unetched silicon often mislead a scanner into identifying space bordered by bars having voids as a wide space rather than a narrow space bounded by two bars. This is addressed by providing a divergent lens such as a cylindrical lens to spread the beam so that it integrates over a larger area along the direction of the bars and spaces.

While spaces on a silicon wafer may be highly specular and give high energy response, the bars too give high energy response, although it is diffused. Recognizing the difference between the specular and diffuse signal permits the use of a polarizer crossed with respect to the laser beam polarization to eliminate all specular reflection effectively throwing away the space signals and picking up essentially only the bar signals, with the exception of the little bit of the diffuse signal that is blocked by the crossed-polarizer. This differentiation between the specular and diffuse radiation provides a contrasting characteristic by which the bars and spaces can be distinguished. But in the many processes in silicon wafer fabrication, various coatings, processing steps, underheating and puddling, for example, can cause the bars to become specularly reflective so that the bar also reads like a space. This is addressed first by recognizing that although these imperfections may create local specular surfaces in the bars, the specular reflection from them may not be oriented as the main specular surface of the spaces. To overcome this, either the bar code surface or the scanner, or both, are tilted so that normal specular reflection is directed off into space away from the scanner/receiver. There is, however, still available specular reflection from the imperfections in the bar, which may be directed back to the scanner. But the crossed-polarizer blocks the specular reflection of the bar imperfections because it is still polarized as the original laser beam light since the crossed-polarizer has been set to completely block. Therefore, to allow the system to pick up that signal the crossed-polarizer is rotated ever so slightly from the crossed position, typically around 5°, just enough to let in some of that specular reflection of the bar imperfections.

There is shown in FIG. 1 an improved bar code reader system 10 according to this invention. Laser 12 provides radiation 14 polarized as indicated by arrow 16 to a lens unit 18 which produces approximately a 3 mil diameter beam 0. This is submitted to a cylindrical lens 22 which produces an elongated beam 24 having a cross section more or less as indicated at 26. Beam 24 is directed from silvered mirror 28 to resonant mirror 30, which is driven to vibrate or oscillate by a mirror drive 32 so that beam 24 scans an area indicated from beam 24a to beam 24b as shown in phantom. Bar code 40 is tilted at an angle of 22½ so that the normal specular reflection from the spaces 42 is directed off into space and not returned. Specular reflection from imperfections 44 may be returned as indicated by the heavier lines 46 and the heavier phantom lines 46a and 46b. However, upon striking mirror 30 they pass to crossed-polarizer 50, which instead of being totally crossed to block all returning radiation polarized as original polarization 16 of laser beam 14, is crossed less than completely using control 52, which leaves crossed-polarizer 50 approximately 5° from fully polarized, e.g., only 95° crossed-polarized, just enough to let in some of the signal. From the crossed-polarizer the light is transmitted through lens 54 to detector 56 and provides a signal in control circuit 58 representative of the scan of the bar code. Control circuit 58, FIG. 2, incldes current to voltage amplifier 60 which receives the output of detector 56 to form a current and provides a voltage to amplifier 62. In amplifier 62 the voltage is amplified by one of a number of different gains under the control of switch 64. In this case, switch 64 repeatedly in sequence chooses one of four different gains. Switch 64 is cycled to the selection of these different gains by means of counter 66, which simply counts the pulses provided by mirror drive 32, FIG. 1, that drive mirror 30. Thus on the first mirror drive pulse 68, counter 66 moves switch 64 to choose the first gain level. On the second clock pulse 70 counter 66 moves switch 64 to select the second gain level, and so on through the fourth mirror drive pulse, after which the system cycles back to the first counter position again. Whatever the selected gain, the signal from amplifier 62 is delivered to amplifier 72 which has associated with it a band width control circuit 74. This circuit limits the band width of the acceptable bar code signal to exclude multiple signals generated from a single bar code element. Following this the signal is converted from analog to digital form in A/D converter 76 and then delivered to a conventional bar code decoder circuit 78. The type of imperfection that gives rise to the need for band width control circuit 74 is shown in FIGS. 3A, B and C, where a typical bar 80 is shown as having an imperfection 82 which is highly specular relative to the surrounding bar. Thus when a scan is made along the direction of scan line 84, the resulting signal 86, FIG. 3B, has a depression 88 instead of a normally rounded top 90. When this is converted to a digital signal from further processing, the digital signal may appear to be actually two separate signals 86a and 86b, thereby misleading the system into thinking it has seen two bars constituted by 86a and 86b surrounding a space indicated by depression 88a, when in fact the actual code element was simply bar 80. By limiting the bandwidth, the higher frequency signals generated by the creation of multiple signals from a single bar code element may be reduced or eliminated. The different gain settings represented by the four switch positions, the four counter outputs and the four pulses 1, 2, 3 and 4, FIG. 2, are illustratively rendered in FIG. 4, where it can be seen that the first gain level is in the range of $10^{-3}$ volts, the second in the range of $10^{-2}$, the third $10^{-1}$, and the fourth, one volt.

The need for the expansion of beam 24 into an elongated shape 26 rather than a round shape is illustrated in FIG. 5, where a single mirror 100 has been used for simplicity in place of mirror 28 and mirror 30. The point of FIG. 5 is to illustrate that while a proper bar 102 is formed by a series of overlapping laser spot 104 etchings. Often, due to imperfect laser control, the resulting bar is shown at 102a, where laser spots 104a are spaced apart, creating voids 106 which the system may see as parts of the interstitial spaces 108. To avoid this, cylindrical lens 22 creates an elongated expanded beam of the shape more or less as shown in 26, so that a scanning beam area 26a on bar 102b will easily overlap spaced spots 104a with voids 106.

Figure 6A:
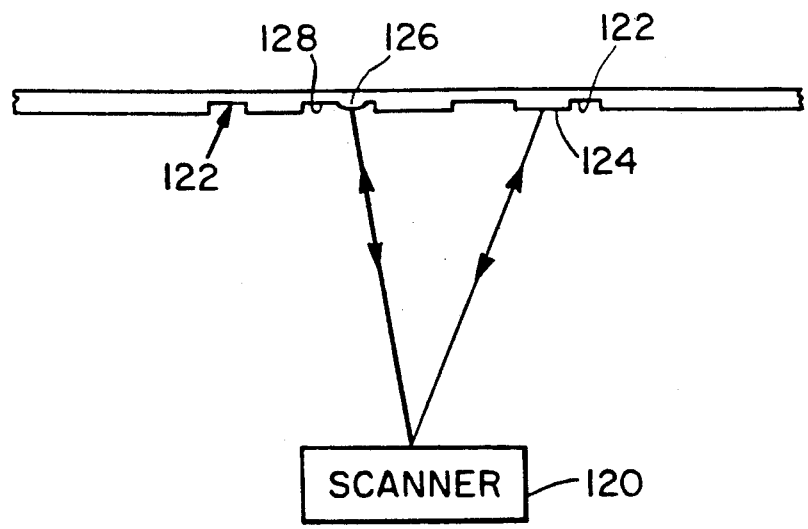
FIG. 6A is a schematic diagram of a prior art bar code scanner.
Figure 6B:
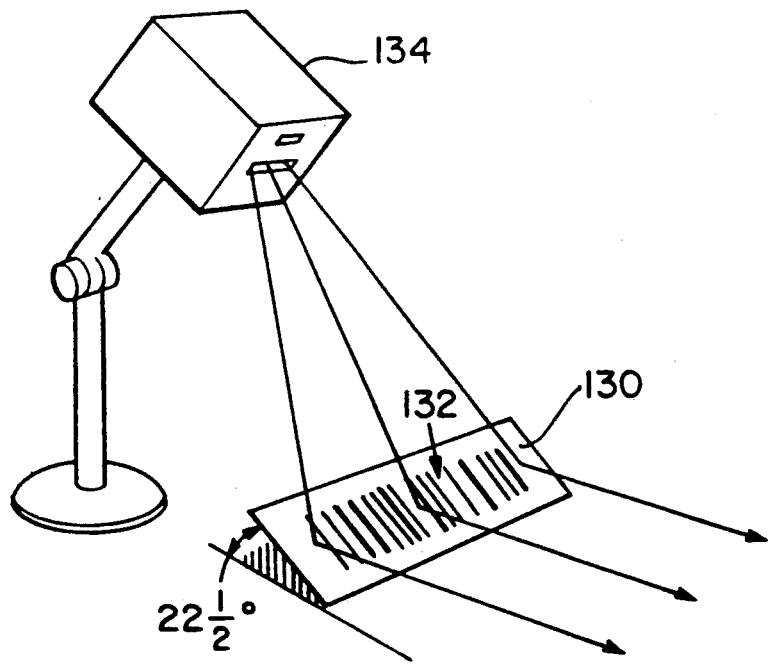
FIG. 6B is a schematic three-dimensional diagram of a scanner according to this invention inclined at 22½° to the bar code to be read.

In prior art devices, FIG. 6A, a scanner 120 facing directly at bar code 122 receives back the specular reflection from space 124 as well as specular reflection from an imperfection 126 in space 128, which will mislead the system. To avoid this, the surface 130, FIG. 6B, of the bar code 132 is disposed at an angle, for example 22½°, to the scanner 134 so that the specular reflection between the spaces is directed off into space away from the scanner, while specular reflection from imperfections in the bars which might be directed back to the scanner and misinterpreted as the reading of a space, is blocked by the crossed-polarizer which can be opened a few degrees to accept some of the specular reflection from the imperfections in the bar elements that are used to process the bar code signal information. This is so because even a small percentage of the radiation reflected back from the specular imperfection area of the bar is an extremely strong signal because of the high reflectivity of the silicon wafer surface.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An improved bar code reader system for reading bar codes having a wide range of intensity of reflected radiation, comprising:
   means for repeatedly scanning a beam of radiation across a bar code containing bar and space code elements;
   means for monitoring the number of scans of the beam across the bar code;
   means for sensing the radiation reflected from the bar code and providing a bar code signal representative thereof;
   means, responsive to the means for sensing, for amplifying said bar code signal at a selected one of a number of prespecified gains; and
   means, responsive to said means for monitoring, for selecting one of said prespecified gains for each scan of the bar code, where the gain selected is associated with a given scan of the bar code.

2. The bar code reader system of claim 1 in which said means for scanning includes means for providing a beam of radiation of elongated cross section in a direction along the bars and spaces.

3. The bar code reader system of claim 1 further including means for limiting the amplified bar code signal to a predetermined bandwidth to exclude spurious signals generated from a single bar code element.

4. The bar code reader system of claim 1 in which said means for sensing senses radiation reflected at an acute angle from the bar code surface and includes:
   means for illuminating a bar code, having specular space elements and diffusive bar elements, with radiation polarized in a first direction, said radiation directed at an acute angle to the surface of the bar code and generally parallel to the bars and spaces, for diverting radiation reflected from said specular spaces away from said means for sensing and for directing a portion of the radiation reflected from specular imperfections in the bars to the means for sensing, and
   substantially cross-polarizing means for blocking a portion of the return from the specular imperfections in the bars and passing substantially half of the radiation diffusively reflected from the bars and a portion of the return from the specular imperfections of the bars.

5. An improved bar code reader system for reading bar codes with diffuse bar elements a specular space elements, comprising:
   means for receiving radiation reflected from a bar code and providing a bar code signal representative thereof;
   means for illuminating a bar code with radiation polarized in a first direction, said radiation directed at an acute angle to the surface of the bar code and generally parallel to the bars and spaces, for diverting radiation reflected from said specular spaces away from said means for receiving and for directing a portion of the radiation reflected from specular imperfections in the bars to the means for receiving; and
   substantially cross-polarizing means for blocking from the means for receiving a portion of the return from the specular imperfections in the bars and transmitting to the means for receiving substantially half of the radiation diffusively reflected from the bars and a portion of the return from the specular imperfections of the bars.

6. The bar code reader system of claim 5 in which said means for illuminating includes means for providing a beam of radiation of elongated cross section in a direction along the bars and spaces.

7. The bar code reader system of claim 5 further including means for limiting the amplified bar code signal to a predetermined bandwidth to exclude spurious signals generated from a single bar code element.

8. The bar code reader system of claim 5 in which said means for illuminating includes means for repeatedly scanning a beam of radiation across the bar code and means for monitoring the number of scans of the beam across the bar code; and said means for receiving includes means for sensing the radiation transmitted from said cross-polarizing means and providing a bar code signal representative thereof; means, responsive to the means for sensing, for amplifying said bar code signal at a selected one of a number of prespecified gains; and means, responsive to said means for monitoring, for selecting one of said prespecified gains for each scan of the bar code, where the gain selected is associated with a given scan of the bar code.

9. The bar code reader system of claim 5 in which said acute angle is approximately $22\frac{1}{2}°$.

10. The bar code reader system of claim 5 in which said cross-polarizing means is less than fully crossed.

11. The bar code reader system of claim 5 in which said crossed-polarizing means is approximately 95% crossed.

12. A method of reading bar codes having a wide range of intensity of reflected radiation comprising:
   repeatedly scanning a beam of radiation across a bar code containing bar and space code elements;
   monitoring the number of scans of the beam across the bar code;
   sensing the radiation reflected from the bar code and providing a bar code signal representative thereof;
   amplifying the bar code signal at a selected one of a number of prespecified gains; and
   selecting one of said prespecified gains for each scan of the bar code, where the gain selected is associated with a given scan of the beam across the bar code.

13. A method employing a scanner for reading bar codes with diffuse bar elements and specular spaces, which scanner provides a bar code signal representative of the bar code, comprising:
   illuminating a bar code with radiation polarized in a first direction, said radiation directed at an acute angle to the surface of the bar code and generally parallel to the bars and spaces, for diverting radiation reflected from the specular spaces away from the scanner and for directing a portion of the radiation reflected from specular imperfections in the bars to the scanner; and
   blocking from the scanner by means of a substantially crossed polarizing means a portion of the return from the specular imperfections in the bars and transmitting to the scanner substantially half of the diffuse radiation from the bars and a portion of the return from the specular imperfections of the bars.

* * * * *